United States Patent
Choi et al.

(10) Patent No.: US 10,376,874 B2
(45) Date of Patent: Aug. 13, 2019

(54) ELECTRODE COMPOSITION FOR CAPACITIVE DEIONIZATION DEVICE, AND ELECTRODE FOR CAPACITIVE DEIONIZATION DEVICE CONTAINING THE SAME

(71) Applicant: Samsung Electronics Co., Ltd., Suwon-si, Gyeonggi-do (KR)

(72) Inventors: Yeong Suk Choi, Suwon-si (KR); Ju Wan Lim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 206 days.

(21) Appl. No.: 15/114,280

(22) PCT Filed: Jan. 29, 2015

(86) PCT No.: PCT/KR2015/000989
§ 371 (c)(1),
(2) Date: Jul. 26, 2016

(87) PCT Pub. No.: WO2015/115845
PCT Pub. Date: Aug. 6, 2015

(65) Prior Publication Data
US 2017/0001188 A1    Jan. 5, 2017

(30) Foreign Application Priority Data

Jan. 29, 2014 (KR) .................. 10-2014-0011746

(51) Int. Cl.
*C02F 1/461* (2006.01)
*B01J 39/20* (2006.01)
(Continued)

(52) U.S. Cl.
CPC ............. *B01J 39/20* (2013.01); *C02F 1/469* (2013.01); *C02F 1/4691* (2013.01);
(Continued)

(58) Field of Classification Search
CPC ........... B01J 39/20; C08F 20/58; C08L 33/26; C08L 33/06; C02F 1/46109
See application file for complete search history.

(56) References Cited

U.S. PATENT DOCUMENTS 5,264,249 A     11/1993  Perrault et al.
5,861,222 A  *   1/1999  Fischer .................. H01M 4/86
                                                    106/1.21
(Continued)

FOREIGN PATENT DOCUMENTS

JP        2001-158806 A      6/2001
JP           4847643 B2     12/2011
(Continued)

OTHER PUBLICATIONS

International Search Report PCT/ISA/210 for International Application No. PCT/KR2015/000989 dated Apr. 17, 2015.

*Primary Examiner* — Bach T Dinh
(74) *Attorney, Agent, or Firm* — Harness, Dickey & Pierce, P.L.C.

(57) ABSTRACT

Provided are a binder composition for an electrode for a capacitive deionization device including a first polymer including a first structural unit including a zwitterionic functional group and a second structural unit including a cross-linkable functional group, a cross-linking agent, and ionic functional group, an electrode for a capacitive deionization device including the composition, a capacitive deionization device including the electrode, and a method of removing ions from a fluid using the device.

19 Claims, 4 Drawing Sheets

(51) Int. Cl.

| | |
|---|---|
| *C02F 1/469* | (2006.01) |
| *C08F 20/10* | (2006.01) |
| *C08L 33/04* | (2006.01) |
| *C08L 101/08* | (2006.01) |
| *C08L 33/06* | (2006.01) |
| *C08F 20/58* | (2006.01) |
| *C08L 33/26* | (2006.01) |

(52) U.S. Cl.
CPC .......... *C02F 1/46109* (2013.01); *C08F 20/10* (2013.01); *C08F 20/58* (2013.01); *C08L 33/04* (2013.01); *C08L 33/06* (2013.01); *C08L 33/26* (2013.01); *C08L 101/08* (2013.01); *C02F 2001/46138* (2013.01); *C08F 2800/10* (2013.01); *C08L 2203/20* (2013.01)

(56) References Cited

U.S. PATENT DOCUMENTS

| | | |
|---|---|---|
| 6,523,699 B1 | 2/2003 | Akita et al. |
| 6,603,055 B2 | 8/2003 | Mitchell et al. |
| 6,603,056 B2 | 8/2003 | Beihoffer et al. |
| 7,855,315 B2 | 12/2010 | Mitchell et al. |
| 8,182,694 B2 | 5/2012 | Childs et al. |
| 8,211,335 B2 | 7/2012 | Deng et al. |
| 8,233,229 B2 | 7/2012 | Wimmer et al. |
| 9,127,108 B2 | 9/2015 | Deng et al. |
| 2004/0069657 A1* | 4/2004 | Hodges .............. A61B 5/14539 205/787 |
| 2007/0158185 A1* | 7/2007 | Andelman ............ C02F 1/4691 204/229.7 |
| 2009/0270709 A1* | 10/2009 | Copp .................. A61B 5/04087 600/395 |
| 2011/0042205 A1 | 2/2011 | Kim et al. |
| 2013/0052530 A1 | 2/2013 | Kitaguchi et al. |
| 2013/0153426 A1 | 6/2013 | Sun et al. |
| 2013/0168097 A1* | 7/2013 | Janssen .................. E21B 43/20 166/305.1 |
| 2014/0349185 A1 | 11/2014 | Momose et al. |
| 2015/0213968 A1 | 7/2015 | Kitaguchi et al. |

FOREIGN PATENT DOCUMENTS

| | | |
|---|---|---|
| JP | 2013-049913 A | 3/2013 |
| KR | 2009-0006822 A | 1/2009 |
| KR | 20100082977 | 4/2010 |
| KR | 2011-0019573 A | 2/2011 |
| KR | 2012-0057750 A | 6/2012 |
| KR | 2012-0059597 A | 6/2012 |
| KR | 1157785 | 6/2012 |
| KR | 1207463 | 12/2012 |
| WO | WO-2013-105623 A1 | 7/2013 |

* cited by examiner

ELECTRODE COMPOSITION FOR CAPACITIVE DEIONIZATION DEVICE, AND ELECTRODE FOR CAPACITIVE DEIONIZATION DEVICE CONTAINING THE SAME

CROSS-REFERENCE TO RELATED APPLICATIONS

This is a National Stage Application under 35 U.S.C. § 371 of International Application No. PCT/KR2015/000989, filed Jan. 29, 2015, which claims priority under 35 U.S.C. § 119 to Korean Application No. 10-2014-0011746, filed Jan. 29, 2014, the entire contents of each of which are hereby incorporated herein by reference.

BACKGROUND

1. Field

An electrode composition for a capacitive deionization device and an electrode for a capacitive deionization device containing the same are disclosed.

2. Description of the Related Art

In some regions, domestic water may include a large amount of minerals. In Europe and other regions, limestone substances frequently flow in underground water, and thus tap water in these regions contains a large amount of minerals. Water having a high mineral content (i.e., hard water) may cause problems of easy occurrence of lime scales in the interior walls of pipes and a sharp decrease in energy efficiency when it is used for home installations, for example, in a heat exchanger or a boiler. In addition, hard water is inappropriate for use as wash water. Therefore, there has been a demand for technology for removing ions from hard water to make it into soft water, in particular, in an environmentally-friendly manner. Further, demands for seawater desalination have increased as larger areas are suffering from water shortages.

A capacitive deionization (CDI) device is a device for applying a voltage to porous electrodes having nano-sized pores to make them carry a polarity and thereby adsorb ionic materials from a medium such as hard water onto the surface of the electrodes and thus remove the same therefrom. In the CDI device, when a medium containing dissolved ions flows between two electrodes of an anode and a cathode and DC power having a low potential difference is applied thereto, the anionic components and the cationic components among the dissolved ions are adsorbed and concentrated onto the anode and the cathode, respectively. When an electric current flows in a reverse direction between the two electrodes by, for example, short-circuiting the two electrodes, the concentrated ions are desorbed from the electrodes. Since the CDI device does not require a high potential difference, its energy efficiency is high, harmful ions may be removed together with the hard components when the ions are adsorbed, and its recycling process does not need any chemicals.

SUMMARY

An embodiment provides an electrode composition for a capacitive deionization device.

Another embodiment provides an electrode for a capacitive deionization device including the composition.

Yet another embodiment provides a capacitive deionization device including the electrode for a capacitive deionization device.

An electrode binder composition for a capacitive deionization device according to an embodiment includes a first hydrophilic polymer including a first structural unit including a zwitterionic functional group represented by represented by Chemical Formula 1 and a second structural unit including a cross-linkable functional group represented by Chemical Formula 2, a cross-linking agent, and an ion exchange group.

[Chemical Formula 1]

In Chemical Formula 1,

$R^1$, $R^2$, and $R^3$ are independently selected from hydrogen, a C1 to C20 alkyl group, a C2 to C20 alkenyl group, a C2 to C20 alkynyl group, a C3 to C30 cycloalkyl group, a C6 to C30 aryl group, or a combination thereof, $R^4$ is selected from hydrogen, a C1 to C10 alkyl group, a C3 to C10 cycloalkyl group, a C6 to C20 aryl group, or a combination thereof, $L^1$ is a single bond, a C1 to C20 alkylene group, a C2 to C20 alkenylene group, a C2 to C20 alkynylene group, a C3 to C30 cycloalkylene group, a C6 to C30 arylene group, or a combination thereof, and A is an anionic functional group.

[Chemical Formula 2]

In Chemical Formula 2,

$R^5$, $R^6$, to $R^7$ are independently selected from hydrogen, a C1 to C20 alkyl group, a C2 to C20 alkenyl group, a C2 to C20 alkynyl group, a C3 to C30 cycloalkyl group, a C6 to C30 aryl group, or a combination thereof, $L^2$ is selected from a single bond, a C1 to C20 alkylene group, a C2 to C20 alkenylene group, a C2 to C20 alkynylene group, a C3 to C30 cycloalkylene group, a C6 to C30 arylene group, or a combination thereof, and $R^8$ is a hydroxy group, a carboxyl group, a cyano group, or an acrylate group.

The first hydrophilic polymer may further include a third structural unit including a hydrophobic functional group represented by Chemical Formula 3:

[Chemical Formula 3]

In Chemical Formula 3, $R^9$, $R^{10}$, and $R^{11}$ are independently selected from hydrogen, a C1 to C20 alkyl group, a C2 to C20 alkenyl group, a 02 to 020 alkynyl group, a C3 to C30 cycloalkyl group, a C6 to C30 aryl group, or a combination thereof, $L^3$ is selected from a single bond, or a C1 to C20 alkylene group, a C2 to C20 alkenylene group, a C2 to C20 alkynylene group, a C3 to C30 cycloalkylene group, a C6 to C30 arylene group, —(C═O)O—, —O(C═O)—, —(C═O)—, —O—, or a combination thereof, and $R^{12}$ is selected from a C1 to C20 alkyl group, a C2 to C20 alkenyl group, a C2 to C20 alkynyl group, a C3 to C30 cycloalkyl group, a C6 to C30 aryl group, a cyano group, or a combination thereof.

In the first hydrophilic polymer, the first structural unit including a zwitterionic functional group represented by Chemical Formula 1 may be included in an amount of about 30 mol % to about 95 mol % and the second structural unit including a cross-linkable functional group represented by Chemical Formula 2 may be included in an amount of about 0.5 mol % to about 5 mol %.

When the first hydrophilic polymer includes the third structural unit including a hydrophobic functional group represented by Chemical Formula 3, the third structural unit may be included in an amount of less than about 50 mol %.

The composition may include one or more second hydrophilic polymers selected from polystyrene, polyacrylic acid-co-maleic acid, polyvinyl alcohol, carboxylmethyl cellulose, hydroxypropyl cellulose, polyvinylchloride, carboxylated polyvinylchloride, polyvinylfluoride, polyvinyl amine, chitosan, polyamide, polyurethane, polyacrylamide, polyacrylamide-co-acrylic acid, a polystyreneacrylic acid copolymer (polystyrene-co-acrylic acid), polytetrafluoroethylene, polyvinylidene fluoride, polyethylene, polypropylene, polyvinylpyrrolidone, an epoxy resin, and a combination thereof, in addition to the first hydrophilic polymer.

The second hydrophilic polymer may be included in an amount of less than or equal to about 50 wt % relative to a weight of the first hydrophilic polymer.

A weight average molecular weight of the first hydrophilic polymer may be about 5,000 to 1,000,000 and a weight average molecular weight of the second hydrophilic polymer may be about 1,000 to 900.000.

The cross-linking agent may be one or more selected from ethylene glycol, glycerol, 1,6-hexanediol 1.4-butanediol, glutaric acid, glutaricaldehyde, succinic acid, succinic anhydride, adipic acid, phthalic acid, ethylene glycol diglycidyl ether, sulfosuccineic acid, sulfosalicylic acid, succinamic acid, ethylenediamine, and a combination thereof.

The ion exchange group may be one or more selected from sulfoacetic acid, sulfophthalic acid, hydroquinonesulfonic acid, sulfobenzoic acid, tetrabutylammonium hydroxide, tetrabutylammonium acetate, tetraethylammonium hydroxide, tetraethylammonium acetate, tetramethylammonium hydroxide, tetramethylammonium acetate, and a combination thereof.

The cross-linking agent may be included in an amount of about 0.5 to 10 parts by weight based on 100 parts by weight of the entire hydrophilic polymer in the binder composition.

The ion exchange group may be included in an amount of about 10 to 300 parts by weight based on 100 parts by weight of the entire hydrophilic polymer in the binder composition.

The binder composition may further include water as a solvent.

The binder composition may be dissolved in an amount of about 5 to 30 wt % in a solvent.

Another embodiment relates to an electrode composition for a capacitive deionization device including the binder composition and an electrode active material.

The electrode active material may be an activated carbon series material or a metal oxide series material.

The activated carbon series material may be an activated carbon powder, an activated carbon fiber, carbon nanotube, carbon aerogel, mesoporous carbon, graphite oxide, or a mixture thereof.

The metal oxide series material may be $RuO_2$, $Ni(OH)_2$, $MnO_2$, $PbO_2$, $TiO_2$, or a mixture thereof.

The electrode active material may be included in an amount of about 5 to about 400 parts by weight, for example about 20 to 300 parts by weight based on 100 parts by weight of the entire hydrophilic polymer in the binder composition.

The electrode composition may further include a conductive material.

The conductive material may be one or more selected from a carbon-based material selected from VGCF (Vapor Growth Carbon Fiber), natural graphite, artificial graphite, acetylene black, ketjen black, XCF (electrically conductive furnace) carbon, SRF (semi-reinforcing furnace black) carbon, and a carbon fiber; a metal powder or a metal fiber selected from copper, nickel, aluminum and silver; a conducting polymer; an inorganic salt of LiCl, NaCl, or KCl; and a mixture thereof.

The conductive material may be included in an amount of about 0.1 parts by weight to about 35 parts by weight based on 100 parts by weight of the electrode active material.

Yet another embodiment provides an electrode for a capacitive deionization device including the electrode composition for a capacitive deionization device, and a method of manufacturing the same.

The electrode for a capacitive deionization device may be manufactured by coating the electrode composition for a capacitive deionization device on a current collector.

The current collector may be in a shape of a sheet, a thin film, or a plain weave gold mesh including aluminum, nickel, copper, titanium, iron, stainless steel, graphite, or a mixture thereof.

The electrode composition may be coated on the current collector using a method of dip coating, spray coating, knife casting, doctor blade coating, spin coating, and the like to form the electrode.

Still another embodiment provides a capacitive deionization device including the electrode for a capacitive deionization device as a cathode or an anode, another electrode facing the anode or the cathode, and a spacer disposed between the cathode and the anode.

The spacer may include an open mesh, non-woven fabric, woven fabric, or foam shape.

The device may further include a charge barrier disposed between the electrode and the spacer and including a different material from the electrode material.

Still another embodiment provides a method of removing ions from a fluid using the capacitive deionization device.

The method of removing ions from a fluid using the capacitive deionization device includes: providing a capacitive deionization device including the electrode for a capacitive deionization device according to the embodiment, another electrode facing the electrode, and a spacer disposed between the electrodes; and applying a voltage to the electrodes while supplying an ion-containing fluid into the capacitive deionization device.

The method of treating the fluid may further include desorbing ions adsorbed on the electrodes by short-circuiting the electrodes, or applying a reverse voltage to the electrodes.

DETAILED DESCRIPTION

Advantages and characteristics of this disclosure, and a method for achieving the same, will become evident referring to the following exemplary embodiments together with the drawings attached hereto. However, this disclosure may be embodied in many different forms and is not to be construed as limited to the embodiments set forth herein; rather, these embodiments are provided so that this disclosure will satisfy applicable legal requirements. Therefore, in some embodiments, well-known process technologies are not explained in detail in order to avoid vague interpretation of the present invention. If not defined otherwise, all terms (including technical and scientific terms) in the specification may be defined as commonly understood by one skilled in the art. The terms defined in a generally-used dictionary may not be interpreted ideally or exaggeratedly unless clearly defined to the contrary. In addition, unless explicitly described to the contrary, the word "comprise" and variations such as "comprises" or "comprising" will be understood to imply the inclusion of stated elements but not the exclusion of any other elements.

Exemplary embodiments may be described referring to exemplary schematic views. Accordingly, the regions shown in the drawing are schematic and do not limit the scope of the disclosure. The same reference numerals designate the same constituent elements throughout the specification.

In the present specification, the term "capacitive deionization device" refers to a device that may separate/concentrate ions by passing fluids to be treated or to be concentrated including at least one ion component through a flow path formed between at least one pair of porous electrodes and applying a voltage thereto so as to adsorb the ion components on the pores in the electrodes. The "capacitive deionization device" may have any geometric structure.

An embodiment relates to an electrode binder composition for a capacitive deionization device that includes a first hydrophilic polymer including first structural unit including a zwitterionic functional group represented by Chemical Formula 1 and a second structural unit including a cross-linkable functional group represented by Chemical Formula 2, a cross-linking agent, and an ion exchange group:

[Chemical Formula 1]

In Chemical Formula 1, $R^1$, $R^2$, and $R^3$ are independently selected from hydrogen, a C1 to C20 alkyl group, a C2 to C20 alkenyl group, a C2 to C20 alkynyl group, a C3 to C30 cycloalkyl group, a C6 to C30 aryl group, or a combination thereof, $R^4$ is selected from hydrogen, a C1 to C10 alkyl group, a C3 to C10 cycloalkyl group, a C6 to C20 aryl group, or a combination thereof, $L^1$ is selected from a single bond, a C1 to C20 alkylene group, a C2 to C20 alkenylene group, a C2 to C20 alkynylene group, a C3 to C30 cycloalkylene group, a C6 to C30 arylene group, or a combination thereof, and A is an anionic functional group.

[Chemical Formula 2]

In Chemical Formula 2, $R^5$, $R^6$, and $R^7$ are independently selected from hydrogen, a C1 to C20 alkyl group, a C2 to C20 alkenyl group, a C2 to C20 alkynyl group, a C3 to C30 cycloalkyl group, a C6 to C30 aryl group, or a combination thereof, $L^2$ is selected from a single bond, or a C1 to C20 alkylene group, a C2 to C20 alkenylene group, a C2 to C20 alkynylene group, a C3 to C30 cycloalkylene group, a C6 to C30 arylene group, or a combination thereof, and $R^8$ is a hydroxy group, a carboxyl group, a cyano group, or an acrylate group.

In Chemical Formula 1, the anionic functional group A may be a hydroxyl group, a carboxyl group, a sulfonic acid group, a phosphonic acid group, an acrylate group, a methacrylate group, or a halogenated salt.

In Chemical Formula 1, $R^1$ to $R^4$ may be all hydrogen, $L^1$ may be a C1 to C10 alkylene group, and the anionic functional group A may be a sulfonic acid group.

For example, the first structural unit represented by Chemical Formula 1 may be derived from a monomer of 2-acrylamido-2-methyl-1-propanesulfonic acid, (3-acrylamidopropyl)trimethylammonium chloride, [2-(acryloyloxy) ethyl]trimethylammonium methylsulfate, vinylbenzyltrimethylammonium chloride, 3-acrylamido-3-methylbutyltrimethyl-ammonium chloride, N,N'-dimethylaminoethyl acrylate, N, N'-dimethylaminoethyl methacrylate, N,N'-dimethylaminomethyl acrylamide, N,N'-dimethylaminopropyl methacrylamide, 2-methacrylamidopropyltrimethylammonium chloride, and the like.

In Chemical Formula 2, $R^5$ may be methyl, $R^6$ and $R^7$ may be hydrogen, $L^2$ may be a C1 to 010 alkylene group, and $R^8$ may be a hydroxy group.

The second structural unit represented by Chemical Formula 2 may be, for example, derived from a monomer of 2-hydroxyethyl methacrylate, 2-hydroxyethyl acrylate, and the like.

The first hydrophilic polymer may further include a third structural unit including a hydrophobic functional group represented by Chemical Formula 3:

[Chemical Formula 3]

In Chemical Formula 3,

$R^9$, $R^{10}$, and $R^{11}$ are independently selected from hydrogen, a C1 to C20 alkyl group, a C2 to C20 alkenyl group, a C2 to C20 alkynyl group, a C3 to C30 cycloalkyl group, a C6 to C30 aryl group, or a combination thereof, $L^3$ is selected from a single bond, or a C1 to C20 alkylene group, a C2 to C20 alkenylene group, a C2 to C20 alkynylene group, a 03 to C30 cycloalkylene group, a C6 to C30 arylene group, —(C=O)O—, —O(C=O)—, —(C=O)—, —O—, or a combination thereof, and

$R^{12}$ is selected from a C1 to 020 alkyl group, a C2 to C20 alkenyl group, a C2 to C20 alkynyl group, a C3 to C30 cycloalkyl group, a C6 to C30 aryl group, a cyano group, or a combination thereof.

In Chemical Formula 3, $R^9$ may be hydrogen or methyl, $R^{10}$ and $R^{11}$ may be hydrogen, $L^3$ may be a single bond or —(C=O)O—, and $R^{12}$ may be a methyl, phenyl, or cyano group.

The third structural unit represented by Chemical Formula 3 may be derived from monomers represented by Chemical Formula 4 to Chemical Formula 6:

[Chemical Formula 4]

[Chemical Formula 5]

[Chemical Formula 6]

In the first hydrophilic polymer, the first structural unit including a zwitterionic functional group represented by Chemical Formula 1 may be included in an amount of about 30 mol % to about 95 mol % and the second structural unit including a cross-linkable functional group represented by Chemical Formula 2 may be included in an amount of about 0.5 mol % to about 5 mol %.

When the first hydrophilic polymer includes the third structural unit including a hydrophobic functional group represented by Chemical Formula 3, the third structural unit may be included in an amount of less than about 50 mol %.

The third structural unit including a hydrophobic functional group may be included within the amount range, and thus solubility of the first hydrophilic polymer in a solvent may be controlled.

The composition may further include an additional second hydrophilic polymer in addition to the first hydrophilic polymer.

The additional second hydrophilic polymer may be any hydrophilic polymer used in an electrode binder composition for a capacitive deionization device. For example, the second hydrophilic polymer may be one or more selected from polystyrene, polyacrylic acid-co-maleic acid, polyvinyl alcohol, carboxylmethyl cellulose, hydroxypropyl cellulose; polyvinylchloride, carboxylated polyvinylchloride, polyvinylfluoride, polyvinyl amine, chitosan, polyamide, polyurethane, polyacrylamide, polyacrylamide-co-acrylic acid, a polystyreneacrylic acid copolymer (polystyrene-co-acrylic acid), polytetrafluoroethylene, polyvinylidene fluoride, polyethylene, polypropylene, polyvinylpyrrolidone, an epoxy resin, and a combination thereof, but is not limited thereto.

In the present specification, "entire hydrophilic polymer" refers to all hydrophilic polymers in the electrode binder composition. That is, when the binder composition includes the first hydrophilic polymer alone, the 'entire hydrophilic polymer' in the binder composition refers to a first hydrophilic polymer in the binder composition, and when the binder composition further include a second hydrophilic polymer in addition to the first hydrophilic polymer, the 'entire hydrophilic polymer' refers to a mixture of the first hydrophilic polymer and the second hydrophilic polymer in the binder composition.

The composition for a binder is mixed with an electrode active material, and increases a bonding force in the electrode active material itself and/or between the electrode active material and a current collector during manufacture of an electrode for a capacitive deionization device.

Because the first hydrophilic polymer including first structural unit includes a zwitterionic functional group represented by represented by Chemical Formula 1, the binder composition including the first hydrophilic polymer may be used either one of an anode or a cathode of a capacitive deionization device. Hydrophilicity of an electrode manufactured using the binder composition may be further improved due to the zwitterionic functional group, and thus ion removal efficiency may be more improved.

The cross-linking agent may be any one having a functional group that is bindable to the cross-linkable functional group of the second structural unit including a cross-linkable functional group represented by Chemical Formula 2 of the first hydrophilic polymer.

For example, the cross-linking agent may be one or more selected from ethylene glycol, glycerol, 1,6-hexanediol, 1.4-butanediol, glutaric acid, glutaricaldehyde, succinic acid, succinic anhydride, adipic acid, phthalic acid, ethylene glycol diglycidyl ether, sulfosuccineic acid, sulfosalicylic acid, succinamic acid, ethylenediamine, and a combination thereof, but is not limited thereto.

The ion exchange group may include a cation exchange group such as sulfoacetic acid, sulfophthalic acid, hydroquinonesulfonic acid, sulfobenzoic acid, and the like, or an anion exchange group such as tetrabutylammonium hydroxide, tetrabutylammonium acetate, tetraethylammonium hydroxide, tetraethylammonium acetate, tetramethylammonium hydroxide, tetramethylammonium acetate, and the like, but is not limited thereto.

In the binder composition, the cross-linking agent may be included in an amount of about 5 to about 100 parts by weight based on 100 parts by weight of the entire hydrophilic polymer in the composition.

Herein, the cross-linking agent may be a cross-linking agent that is cross-linkable with both the first hydrophilic polymer and the second hydrophilic polymer, or may include a first cross-linking agent cross-linkable with the first hydrophilic polymer and a second cross-linking agent cross-linkable with the second hydrophilic polymer.

When the cross-linking agent is included within the amount range, the cross-linking agent may be cross-linked with the entire hydrophilic polymer in the binder composition, that is, the first hydrophilic polymer, or the first and the second hydrophilic polymers present in the binder composition in an appropriate ratio.

The ion exchange group may be included in an amount of about 10 to about 300 parts by weight based on 100 parts by weight of the entire hydrophilic polymer in the binder composition.

When the ion exchange group is included within the amount range, the ion exchange group may be bound to the entire hydrophilic polymer including the first hydrophilic polymer or the first and second hydrophilic polymers in an appropriate ratio, and the ion removal efficiency of a capacitive deionization device may be increased.

The binder composition may further include water as a solvent. The binder composition includes the first hydrophilic polymer including the zwitterionic functional group as a main component, and optionally the second hydrophilic polymer, and thus a hydrophilic solvent such as water may be used and the binder composition is environmentally-friendly.

A weight average molecular weight of the first hydrophilic polymer may be about 5,000 to 1,000,000 and a weight average molecular weight of the second hydrophilic polymer may be about 1,000 to 900,000.

For example, each weight average molecular weight of the first hydrophilic polymer and second hydrophilic polymer may be about 30,000 to 500,000. When the weight average molecular weight is within the ranges, the polymer may be dissolved in a solvent in an amount of about 3 to 15 wt %.

When the weight average molecular weight of the polymer and a concentration in a solvent are within the ranges, viscosity may be appropriate during preparation of a binder or preparation of electrode slurry with an electrode active material, and binding characteristics of electrode active materials are improved.

Another embodiment relates to an electrode composition for a capacitive deionization device including the binder composition and an electrode active material.

The electrode active material may be an activated carbon series material when the electrode is a cathode, and may be a metal oxide series material when the electrode is an anode.

The activated carbon series material may be an activated carbon powder, an activated carbon fiber, carbon nanotube, carbon aerogel, mesoporous carbon, graphite oxide, or a mixture thereof.

The metal oxide series material may be $RuO_2$, $Ni(OH)_2$, $MnO_2$, $PbO_2$, $TiO_2$, or a mixture thereof.

The electrode active material may be included in an amount of about 5 to about 400 parts by weight, for example about 20 to 300 parts by weight range based on 100 parts by weight of the entire hydrophilic polymer in the binder composition. When a ratio of the electrode active material in the electrode composition and the polymer in the binder composition is within the range, proper viscosity during preparation of electrode slurry may be obtained and binding characteristics of electrode active materials are improved.

The electrode composition may further include a conductive material.

The conductive material may be one or more selected from a carbon-based material selected from VGCF (Vapor Growth Carbon Fiber), natural graphite, artificial graphite, acetylene black, ketjen black, XCF (electrically conductive furnace) carbon, SRF (semi-reinforcing furnace black) carbon, and a carbon fiber; a metal powder or a metal fiber selected from copper, nickel, aluminum and silver; a conducting polymer; an inorganic salt of LiCl, NaCl, or KCl; and a mixture thereof.

The conductive material may be included in an amount of about 0.1 parts by weight to about 35 parts by weight based on 100 parts by weight of the electrode active material. When the conductive material is included in an amount of less than 0.1 parts by weight, conductivity of an electrode may be insufficient, and when it is included in an amount of greater than 35 parts by weight, it may be not economically preferable, and porosity of an electrode may be reduced.

The electrode composition may be prepared as electrode slurry when the binder composition further includes a solvent such as water and the like, and this electrode slurry may be coated on a current collector, manufacturing an electrode.

Accordingly, another embodiment provides an electrode for a capacitive deionization device including the electrode composition for a capacitive deionization device and a method of manufacturing the same.

The electrode may be an anode or a cathode, and when the electrode is an anode, it may have a cation exchange group, and when the electrode is a cathode, it may have an anion exchange group.

The electrode for a capacitive deionization device may be manufactured by coating the electrode composition for a capacitive deionization device on a current collector.

The current collector may be in a shape of a sheet, a thin film or a plain weave gold mesh including aluminum, nickel, copper, titanium, iron, stainless steel, graphite, or a mixture thereof.

The coating of the electrode composition on the current collector may be performed using a method of dip coating, spray coating, knife casting, doctor blade coating, spin coating, and the like.

The thickness of the electrode may not be particularly limited, and may be selected within an appropriate range. For example, the thickness of the electrode may be about 50 µm to about 500 µm, for example, about 100 µm to 350 µm.

The electrode may be manufactured by additionally coating an ion exchange polymer on a surface of the electrode material coated on the current collector.

The ion exchange polymer may be a polymer including a cation exchange group selected from a sulfonic acid group (—$SO_3H$), a carboxyl group (—COOH), a phosphonic group (—$PO_3H_2$), a phosphinic group (—$HPO_3H$), an arsenic group (—$AsO_3H_2$), and a selenonic acid group (—$SeO_3H$) at a main chain or a side chain of the above generally-used binder polymer, or a polymer including an anion exchange group selected from a quaternary ammonium salt (—$NR_3$), primary or tertiary amine groups (—$NH_2$, —$NHR$, or —NR2), a quaternary phosphonium group (—PR4), and a tertiary sulfonium group (—SR3) at a main chain or a side chain of the polymer. Such a polymer may be synthesized using an appropriate method, or may be a commercially available product.

In addition, yet another embodiment provides a capacitive deionization device including a cathode or an anode that is the electrode for a capacitive deionization device or an anode or an cathode facing it, and a spacer disposed between the cathode and the anode.

The device may further include a charge barrier disposed between the electrode and the spacer and made of a different material from the electrode material.

The spacer disposed between the pair of electrodes may form a path (i.e., a flow path) for flowing a fluid between the electrodes, and includes an electrically insulating material and thus prevents a short-circuit between the electrodes.

The spacer may be formed of any material for forming a flow path and preventing an electrode short-circuit, and may have any structure. As a non-limiting example, the spacer may have an open mesh, non-woven fabric, woven fabric, or foam shape. As a non-limiting example, the spacer may include polyesters such as polyethylene terephthalate and the like; polyolefins such as polypropylene, polyethylene, and the like; polyamides such as nylon and the like; an aromatic vinyl-based polymer such as polystyrene; a cellulose derivative such as cellulose, methyl cellulose, acetylmethyl cellulose, and the like; a polyetherether ketone; a polyimide; polyvinyl chloride; or a combination thereof. The thickness of the spacer is not particularly limited, but it may range from about 50 μm to about 500 μm, for example about 100 μm to about 300 μm, in light of the flow amount and the solution resistance. The open area of the spacer may range from about 20% to about 80%, for example, about 30% to about 50%, in light of the flow amount and the solution resistance.

The capacitive deionization device may further include a charge barrier disposed between the spacer and the electrode. The charge barrier may be a cation permselective membrane or an anion permselective membrane. The cation or anion permselective membrane may be prepared by an appropriate method, or is commercially available. Examples of cation or anion permselective membranes which may be used in the capacitive deionization device may include, but are not limited to, Neosepta CMX, Neosepta AMX, or the like manufactured by Tokuyama.

Figure 1:
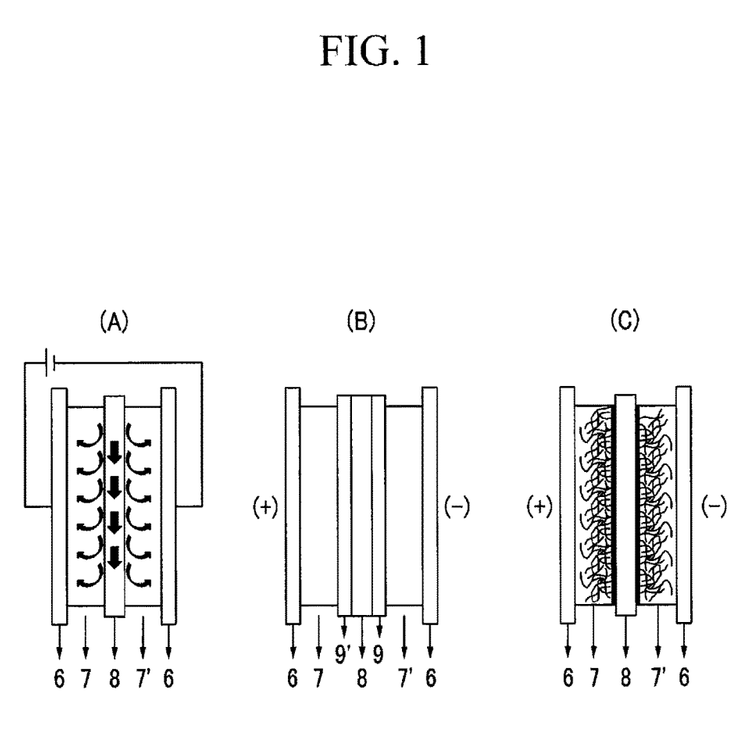
FIG. 1 is a schematic view showing examples of a capacitive deionization device

The capacitive deionization device may have any geometric structure. By way of non-limiting examples, the capacitive deionization device may have a schematic structure as shown in FIG. 1(A) to (C). Hereinafter, the capacitive deionization device will be explained with reference to the drawings.

Referring to FIG. 1(A), electrodes 7 and 7' are respectively coated on current collectors 6, and a spacer 8 is interposed between the electrodes 7 and 7' to provide a flow path. In the capacitive deionization device shown in FIG. 1(B), the electrodes 7 and 7' are respectively coated on current collectors 6, a spacer 8 is inserted between the electrodes 7 and 7' to provide a flow path, and a cation permselective membrane 9' and an anion permselective membrane 9 are interposed between the electrode 7 and the spacer 8, and between the electrode 7' and the spacer 8, respectively. In addition, in the case of a device shown in FIG. 1(C), electrodes 7 and 7' are respectively coated on current collectors 6, and a spacer 8 is interposed between the electrodes 7 and 7' to define a flow path, wherein the electrode 7 is an anode using an anion exchange binder, and the electrode 7' is a cathode using a cation exchange binder.

Another embodiment provides a method of removing ions from a fluid using the capacitive deionization device.

Specifically, the method includes treating the fluid by providing a capacitive deionization device including an electrode for a capacitive deionization device according to an embodiment, another electrode facing the electrode, and a spacer disposed between the electrodes, and applying a voltage to the electrodes while supplying an ion-containing fluid into the capacitive deionization device.

The method of treating the fluid may further include desorbing ions adsorbed in the electrodes by short-circuiting the electrodes or applying a reverse voltage to the electrodes in a reverse direction.

The details of the capacitive deionization device are the same as described above.

The ion-containing fluid supplied into the capacitive deionization device is not particularly limited, but for example, it may be sea water, or it may be hard water containing calcium ions or magnesium ions. The rate of supplying the fluid is not particularly limited, but may be adjusted as required. For example, the rate may range from about 5 to about 50 ml/m in.

When a DC voltage is applied to the electrode while supplying the fluid, the ions present in the fluid are adsorbed onto the surface of the electrode. The applied voltage may be appropriately selected in light of the cell resistance, the concentration of the solution, or the like, and for example, it may be about 2.5 V or lower, for example, may range from about 1.0 V to about 2.0 V. When applying the voltage, the ion removal efficiency, as calculated from the measurement of the ion conductivity of the fluid, may be about 50% or higher, for example, about 75% or higher, for example, about 90% or higher.

The aforementioned capacitive deionization device and the aforementioned methods may find utility in most home appliances using water, for example, a washing machine, a dish washer, a refrigerator, a water softener, or the like, and may also be used in an industrial water treatment device such as for seawater desalination and ultrapure water manufacture.

Hereinafter, the embodiments are illustrated in more detail with reference to examples. However, it is understood that the scope of the present invention is not limited to these examples.

Examples

Preparation Examples 1 to 5: Synthesis of First Hydrophilic Polymer for Binder

A first polymer for a binder is prepared by including 2-acrylamido-2-methyl-1-propane sulfonic acid as a first monomer having a zwitterionic functional group, methyl methacrylate as a second monomer including hydrophobic functional group for adjusting solubility, 2-hydroxyethyl methacrylate (HEMA) as a third monomer having a cross-linkable functional group to have a composition provided in Table 1. Herein, 0.4 g of KPS (potassium persulfate) as a polymerization initiator and water as a solvent are used.

TABLE 1

|  | First monomer (g) | Second monomer (g) | Third monomer (g) | Mole ratio (First monomer:Second monomer:Third monomer) |
|---|---|---|---|---|
| Preparation Example 1 | 14.3 | 2.8 | 1.21 | 5:4:1.5 |
| Preparation Example 2 | 28.5 | 0 | 1.21 | 9:0:1.5 |
| Preparation Example 3 | 2.8 | 5.6 | 1.21 | 1:8:1.5 |
| Preparation Example 4 | 7.1 | 4.6 | 1.21 | 2:7:1.5 |
| Preparation Example 5 | 21.4 | 1.5 | 1.21 | 7:2:1.5 |

Examples 1 to 4 and Comparative Example 1: Manufacture of Anode for CDI Device

A polymer aqueous solution is prepared by using the first hydrophilic polymer according to Preparation Example 1 or 2 and commercially available polyvinyl alcohol (PVA) (Mw: 300,000) as a second hydrophilic polymer, mixing the first and second hydrophilic polymers in a ratio provided in Table 2, and dissolving them in a concentration of 10% in water. A binder solution is prepared by adding 0.7 g of sulfosuccinic acid as a cross-linking agent and sulfosalicylic acid as a cation exchange functional group within the amount ranges provided in Table 2 to 12.6 g of the polymer aqueous solution and stirring the mixture. Then, 0.45 g of Super-P as a conductive agent is injected into the binder solution, and the obtained mixture is stirred with a Thinky mixer for 10 minutes to prepare slurry. Subsequently, 3 g of activated carbon (SPY) as an active material is injected into the slurry, and then, stirred with a Thinky mixer for 10 minutes. When the slurry has too high viscosity, an appropriate amount of water is added thereto, and the mixture is additionally stirred.

The slurry is coated to be 200 to 300 μm thick on each surface of a conductive graphite sheet (thickness=250 μm) with a doctor blade, heat-treated in a hot air drier, and cured in a 130° C. oven for 5 hours. An electrode manufactured therefrom is dipped in deionized water (DI water) and washed for a few hours to remove a non-reacted cross-linking agent and an ion exchange group.

On the other hand, an anode according to Comparative Example 1 is manufactured by using a binder including no first hydrophilic polymer prepared in Preparation Example 1 or 2 but 12.6 g of a commercially available PVA polymer and the same other components as above

TABLE 2

|  | Binder polymer | Amount of cation exchange functional group |
|---|---|---|
| Comparative Example 1 | 12.6 g of PVA | 2.8 g |

TABLE 2-continued

|  | Binder polymer | Amount of cation exchange functional group |
|---|---|---|
| Example 1 | Preparation Example 1 9 g of a polymer + 3 g of PVA | 2.8 g |
| Example 2 | Preparation Example 2 9 g of a polymer + 3 g of PVA | 2.8 g |
| Example 3 | Preparation Example 1 9 g of a polymer + 3 g of PVA | 0 g |
| Example 4 | Preparation Example 2 9 g of a polymer + 3 g of PVA | 0 g |

Preparation Example 6: Manufacture of Cathode for CDI Device

A cathode is manufactured as follows:
1) A 10% PVA aqueous solution as a binder is prepared. 12.6 g of the PVA aqueous solution is mixed with 2.1 g of GTMAc (glucidyl trimethylammonium chloride), and then, stirred therewith.
2) 0.45 g of Super-P as a conductive agent and 3 g of activated carbon are added to the solution, and the resulting mixture is stirred with a Thinky mixer for 10 minutes to prepare slurry.
3) 0.72 g of glutaric acid as a cross-linking agent is added to the slurry, and the obtained mixture is stirred with a Thinky mixer for 10 minutes.
4) The slurry of 3) is coated to be 200 to 300 μm thick on each surface of a conductive graphite sheet (a thickness=250 μm) with a doctor blade.
5) The coated sheet of 4) is dried at room temperature for 3 hours and heat-treated at 130° C. for 2 hours.
6) An electrode obtained from 5) is dipped in DI water and washed for a few hours to remove a non-reacted cross-linking agent and ion exchange agent.

Preparation Example 7: Assembly of CDI Device

Each electrode according to Example and Preparation Example is used as an anode and a cathode, and a water-permeable open polyamide mesh as a spacer is used. A CDI device is manufactured by stacking a graphite plate/a reference anode (thickness: about 100 to 250 μm)/a spacer/the cathode according to the Examples or Comparative Example 1 (thickness: 200 to 350 μm)/a graphite plate in order, and then locked with a screw.

Experimental Example: Ion Removal Performance of Capacitive Deionization (CDI) Device The electrodes according to Comparative Example 1 and Examples 1 to 4 are respectively used to manufacture each CDI device in the following procedure, and then, an ion adsorption removal of the CDI device is tested, and the results are provided in FIGS. 2 to 4 and Table 3:
1) The device is operated at room temperature and supplied with 250 mg/L of a standard hard water solution (conductivity: about 830 μS/cm) at a speed of 27 to 28 mL/min.
2) The device is regenerated by connecting each electrode to a power source and maintaining a cell voltage (a potential difference between anode and cathode) at 1.5 V for one minute to remove ions, and then, at −0.8 V for 5 minutes.
3) Conductivity of water coming out through the device is measured in real time by using a flow type conductivity sensor.

4) An amount of charged charge at each step is measured from an amount of a current supplied from the power source.

5) An ion removal rate (%) of the device is obtained from measured ion conductivity through the following equation:

Ion removal rate (%)=(conductivity of inflow water−conductivity of outflow water)/(conductivity of inflow water)*100

The standard hard water is used, when ion conductivity reaches 83.0 mS after sufficiently dissolving 27.241 g of $CaCl_2 \cdot 2H_2O$, 15.741 g of $MgSO_4 \cdot 2H_2O$, and 27.887 g of $NaHCO_3$ in 100 L of distilled water.

TABLE 3

|  | Desalting of less than or equal to 100 μS/cm (μS sec/cm) | Minimum ion conductivity (μS/cm) |
| --- | --- | --- |
| Comparative Example 1 | 760 | 72 |
| Example 1 | 1280 | 53 |
| Example 2 | 1720 | 56 |
| Example 3 | 110 | 91 |
| Example 4 | 0 | 114 |

As shown in Table 3, the electrodes including an ion exchange functional group of sulfosalicylic acid according to Examples 1 and 2 show remarkably increased ion removal performance compared with the electrode including the same ion exchange functional group according to Comparative Example 1. In addition, ion removal efficiency turns out to be much increased due to low minimum conductivity at the power output section of the electrodes.

On the other hand, the electrodes including no ion exchange functional group according to Examples 3 and 4 exhibit some desalting effects, which are caused by a cationic functional group included in the first hydrophilic polymer in the binder according to the Examples. In other words, the desalting effect may be obtained by including the cationic functional group in the first polymer according to an embodiment of the present invention, and when the ion exchange functional group is added thereto, the ion removal effect may be further increased.

On the other hand, the electrode including no ionic functional group in a polymer according to Comparative Example 1 may have only a desalting effect due to the ion exchange functional group and thus a lower desalting effect and higher conductivity at an electrode output section compared with Examples 1 and 2.

Figure 2:
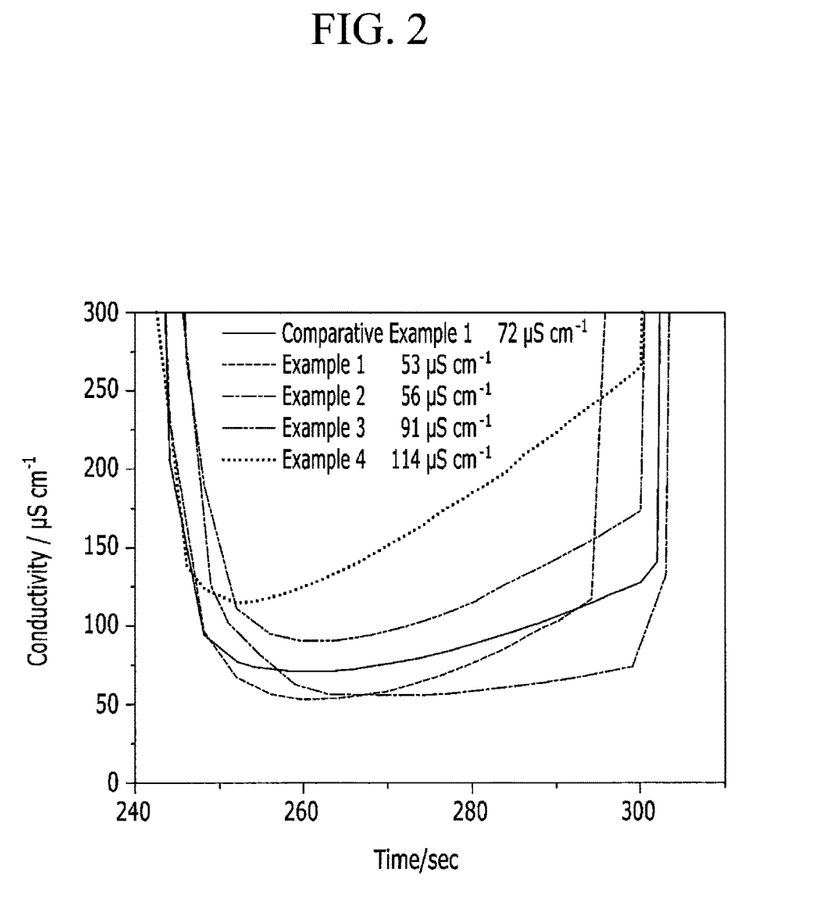
FIG. 2 is a graph showing ion conductivity changes of capacitive deionization devices manufactured by respectively using each electrode according to Examples and Comparative Examples depending on time, which evaluated in a constant voltage method.

FIG. 2 is a graph showing ion conductivity changes of CDI devices respectively using the electrode according to Examples and Comparative Examples depending on time according to the following method. Based on FIG. 2, minimum ion conductivity of each device may be obtained.

Figure 3:
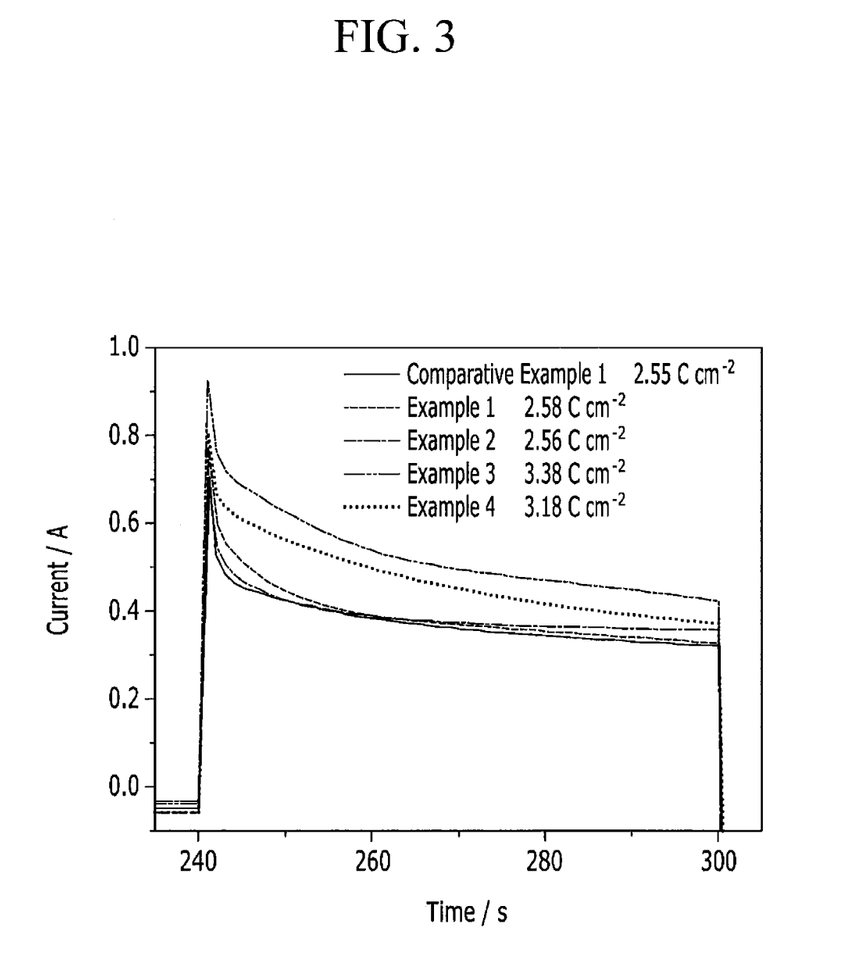
FIG. 3 is a graph showing a current change of the capacitive deionization device depending on time, which is converted from the evaluation of FIG. 2.

FIG. 3 shows a current change depending on time based on the graph of FIG. 2.

In addition, the electrodes are charged at 1.5 V for 1 minute, and their stored charge capacities (charge densities) are measured and provided in Table 4. The charge densities are obtained by integrating an area in each graph in FIG. 3 and dividing the integral value by the area.

TABLE 4

|  | Comparative Example 1 | Example 1 | Example 2 | Example 3 | Example 4 |
| --- | --- | --- | --- | --- | --- |
| Charge capacity C/cm² | 2.55 | 2.58 | 2.56 | 3.38 | 3.18 |

Figure 4:
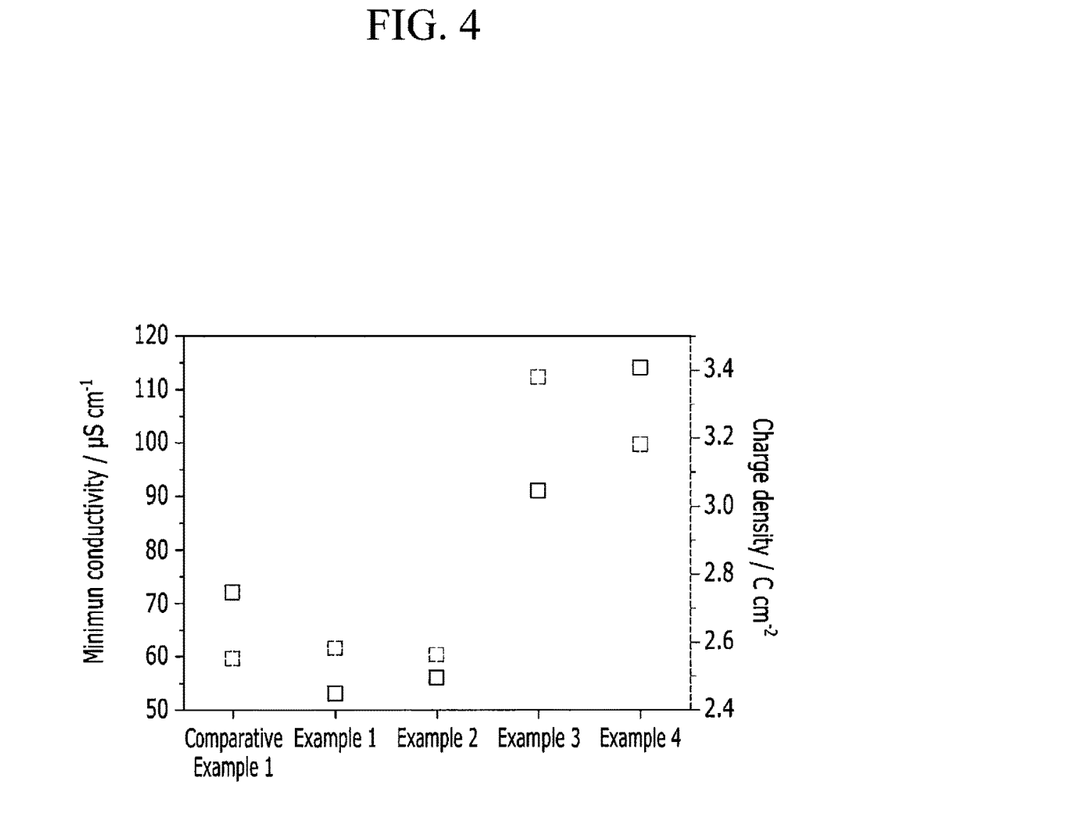
FIG. 4 is a graph showing minimum ion conductivity and charge density of each capacitive deionization device manufactured by respectively using the electrodes according to Examples and Comparative Examples.

The measured minimum ion conductivity and charge density are provided in a graph of FIG. 4. The electrodes including a first hydrophilic polymer and an ion exchange functional group in a binder according to Examples 1 and 2 show the lowest minimum ion conductivity and charge density and thus excellent ion removal performance.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electrode binder composition for a capacitive deionization device, comprising:

a first hydrophilic polymer, a cross-linking agent, and an ion exchange group, the first hydrophilic polymer comprising a first structural unit, a second structural unit, and a third structural unit, the first structural unit represented by Chemical Formula 1 and including a zwitterionic functional group, the second structural unit represented by Chemical Formula 2 and including a cross-linkable functional group, the third structural unit represented by Chemical Formula 3 and including a hydrophobic functional group,

[Chemical Formula 1]

wherein in Chemical Formula 1,

$R^1$, $R^2$, and $R^3$ are independently selected from hydrogen, a C1 to C20 alkyl group, a C2 to C20 alkenyl group, a C2 to C20 alkynyl group, a C3 to C30 cycloalkyl group, a C6 to C30 aryl group, or a combination thereof, $R^4$ is selected from hydrogen, a C1 to C10 alkyl group, a C3 to C10 cycloalkyl group, a C6 to C20 aryl group, or a combination thereof, L¹ is a single bond, a C1 to C20 alkylene group, a C2 to C20 alkenylene group, a C2 to C20 alkynylene group, a C3 to C30 cycloalkylene group, a C6 to C30 arylene group, or a combination thereof, and A is an anionic functional group,

[Chemical Formula 2]

wherein in Chemical Formula 2, $R^5$, $R^6$, and $R^7$ are independently selected from hydrogen, a C1 to C20 alkyl group, a C2 to C20 alkenyl group, a C2 to C20 alkynyl group, a C3 to C30 cycloalkyl group, a C6 to C30 aryl group, or a combination thereof, $L^2$ is selected from a single bond, a C1 to C20 alkylene group, a C2 to C20 alkenylene group, a C2 to C20 alkynylene group, a C3 to C30 cycloalkylene group, a C6 to C30 arylene group, or a combination thereof, and $R^8$ is a hydroxy group, a carboxyl group, a cyano group, or an acrylate group,

[Chemical Formula 3]

wherein in Chemical Formula 3, $R^9$, $R^{10}$, and $R^{11}$ are independently selected from hydrogen, a C1 to C20 alkyl group, a C2 to C20 alkenyl group, a C2 to C20 alkynyl group, a C3 to C30 cycloalkyl group, a C6 to C30 aryl group, or a combination thereof, $L^3$ is selected from a single bond, or a C1 to C20 alkylene group, a C2 to C20 alkenylene group, a C2 to C20 alkynylene group, a C3 to C30 cycloalkylene group, a C6 to C30 arylene group, —(C=O)O—, —O(C=O)—, —(C=O)—, —O—, or a combination thereof, and $R^{12}$ is selected from a C1 to C20 alkyl group, a C2 to C20 alkenyl group, a C2 to C20 alkynyl group, a C3 to C30 cycloalkyl group, a C6 to C30 aryl group, a cyano group, or a combination thereof.

2. The electrode binder composition for a capacitive deionization device of claim 1, wherein A of Chemical Formula 1 is a hydroxy group, a carboxyl group, a sulfonic acid group, a phosphonic acid group, an acrylate group, a methacrylate group, or a halogenated salt.

3. The electrode binder composition for a capacitive deionization device of claim 1, wherein $R^1$ to $R^4$ of Chemical Formula 1 are all hydrogen, $L^1$ is a C1 to C10 alkylene group, and A is a sulfonic acid group.

4. The electrode binder composition for a capacitive deionization device of claim 1, wherein $R^5$ of Chemical Formula 2 is methyl, $R^6$ and $R^7$ are hydrogen, $L^2$ is a C1 to C10 alkylene group, and RB is a hydroxy group.

5. The electrode binder composition for a capacitive deionization device of claim 1, wherein $R^9$ of Chemical Formula 3 is hydrogen or methyl, $R^{10}$ and $R^{11}$ are hydrogen, $L^3$ is a single bond or —(C=O)O—, and $R^{12}$ is a methyl, phenyl, or cyano group.

6. The electrode binder composition for a capacitive deionization device of claim 1, wherein the third structural unit represented by Chemical Formula 3 is derived from monomers represented by Chemical Formula 4 to Chemical Formula 6:

[Chemical Formula 4]

[Chemical Formula 5]

[Chemical Formula 6]

7. The electrode binder composition for a capacitive deionization device of claim 1, further comprising:
at least one second hydrophilic polymer selected from polystyrene, polyacrylic acid-co-maleic acid, polyvinyl alcohol, carboxylmethyl cellulose, hydroxypropyl cellulose, polyvinylchloride, carboxylated polyvinylchloride, polyvinylfluoride, polyvinyl amine, chitosan, polyamide, polyurethane, polyacrylamide, polyacrylamide-co-acrylic acid, a polystyreneacrylic acid copolymer, polytetrafluoroethylene, polyvinylidene fluoride, polyethylene, polypropylene, polyvinylpyrrolidone, an epoxy resin, and a combination thereof.

8. The electrode binder composition for a capacitive deionization device of claim 7, wherein the second hydrophilic polymer is included in an amount of less than or equal to about 50 wt % relative to a weight of the first hydrophilic polymer.

9. The electrode binder composition for a capacitive deionization device of claim 1, wherein the first structural unit including a zwitterionic functional group represented by Chemical Formula 1 is included in an amount of about 30 mol % to about 95 mol % and the second structural unit including a cross-linkable functional group represented by Chemical Formula 2 is included in an amount of about 0.5 mol % to about 5 mol % in the first hydrophilic polymer.

10. The electrode binder composition for a capacitive deionization device of claim 1, wherein the third structural unit represented by Chemical Formula 3 is included in an amount of less than about 50 mol % in the first hydrophilic polymer.

11. The electrode binder composition for a capacitive deionization device of claim 1, wherein the cross-linking agent is one or more selected from ethylene glycol, glycerol, 1,6-hexanediol, 1.4-butanediol, glutaric acid, glutaricaldehyde, succinic acid, succinic anhydride, adipic acid, phthalic acid, ethylene glycol diglycidyl ether, sulfosuccineic acid, sulfosalicylic acid, succinamic acid, ethylenediamine, and a combination thereof.

12. The electrode binder composition for a capacitive deionization device of claim 1, wherein the ion exchange group is one or more selected from sulfoacetic acid, sulfophthalic acid, hydroquinonesulfonic acid, sulfobenzoic acid, tetrabutylammonium hydroxide, tetrabutylammonium acetate, tetraethylammonium hydroxide, tetraethylammonium acetate, and a combination thereof.

13. The electrode binder composition for a capacitive deionization device of claim 1, wherein based on 100 parts by weight of the first hydrophilic polymer, the cross-linking agent is included in an amount of about 0.5 to 10 parts by weight, and the ion exchange group is included in an amount of about 5 to 50 parts by weight.

14. An electrode composition for a capacitive deionization device comprising:
 the electrode binder composition of claim 1; and
 an electrode active material.

15. The electrode composition of claim 14, wherein the electrode active material is an activated carbon series material of an activated carbon powder, an activated carbon fiber, carbon nanotube, carbon aerogel, mesoporous carbon, graphite oxide, or a mixture thereof, or a metal oxide series material of $RuO_2$, $Ni(OH)_2$, $MnO_2$, $PbO_2$, $TiO_2$, or a mixture thereof.

16. The electrode composition of claim 14, wherein the electrode active material is included in an amount of about 10 to about 400 parts by weight based on 100 parts by weight of the first hydrophilic polymer in the electrode binder composition.

17. The electrode composition of claim 14, further comprising:
 at least one conductive material selected from a carbon-based material selected from VGCF (Vapor Growth Carbon Fiber), natural graphite, artificial graphite, acetylene black, ketjen black, XCF carbon, SRF carbon, and a carbon fiber; a metal powder or a metal fiber selected from copper, nickel, aluminum, and silver; a conducting polymer; an inorganic salt of LiCl, NaCl, or KCl; and a mixture thereof.

18. An electrode for a capacitive deionization device comprising the electrode composition of claim 14.

19. A capacitive deionization device comprising the electrode of claim 18.

* * * * *